United States Patent
Verma et al.

(10) Patent No.: US 11,798,039 B2
(45) Date of Patent: Oct. 24, 2023

(54) IN-VEHICLE ADVERTISEMENT SYSTEMS AND METHODS

(71) Applicant: Ford Global Technologies, LLC, Dearborn, MI (US)

(72) Inventors: Himanshu Verma, Farmington Hills, MI (US); Fling Finn Tseng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/650,637

(22) Filed: Feb. 10, 2022

(65) Prior Publication Data

US 2023/0252527 A1    Aug. 10, 2023

(51) Int. Cl.
*G06Q 30/02* (2023.01)
*G06Q 30/0272* (2023.01)
(Continued)

(52) U.S. Cl.
CPC ......... *G06Q 30/0272* (2013.01); *B60W 40/08* (2013.01); *B60W 40/105* (2013.01);
(Continued)

(58) Field of Classification Search
CPC ........... G06Q 30/0272; G06Q 30/0265; G06Q 30/0271; B60W 40/08; B60W 40/105;
(Continued)

(56) References Cited

U.S. PATENT DOCUMENTS

2013/0275224 A1   10/2013 Prakah-Asante et al.
2014/0201004 A1    7/2014 Parundekar et al.
(Continued)

OTHER PUBLICATIONS

The influence of banner advertisements on attention and memory: human faces with averted gaze can enhance advertising effectiveness, Pitch Sajjacholapunt and Linden J. Ball, p. 3, Frontiers In Psychology, Mar. 2014 (Year: 2014).*

(Continued)

*Primary Examiner* — Ilana L Spar
*Assistant Examiner* — Darnell A Pouncil
(74) *Attorney, Agent, or Firm* — Brandon Hicks; Eversheds Sutherland (US) LLP

(57) ABSTRACT

The disclosure is generally directed to in-vehicle advertisement systems and methods. An example method executed by processor of a vehicle may include determining an attention availability index of a driver of a vehicle and determining a first presentation duration of a first advertisement based on the attention availability index. In one scenario, the attention availability index of the driver may be determined by applying an inverse relationship to a concentration index associated with driving the vehicle. The first advertisement is presented over the first presentation duration, via an advertisement presentation device in the vehicle. In another scenario, the attention availability index of the driver may be compared to a threshold value. Based on the comparison, a second presentation duration for a second advertisement may be determined and the second advertisement presented via the advertisement presentation device in the vehicle.

20 Claims, 4 Drawing Sheets

(51) Int. Cl.
    *G06Q 30/0251*     (2023.01)
    *B60W 40/105*     (2012.01)
    *B60W 40/08*     (2012.01)

(52) U.S. Cl.
    CPC ..... *G06Q 30/0265* (2013.01); *G06Q 30/0271* (2013.01); *B60W 2530/18* (2013.01); *B60W 2540/229* (2020.02); *B60W 2554/406* (2020.02)

(58) Field of Classification Search
    CPC ....... B60W 2530/18; B60W 2540/229; B60W 2554/406
    See application file for complete search history.

(56) References Cited

U.S. PATENT DOCUMENTS

| | | | |
|---|---|---|---|
| 2014/0279021 A1* | 9/2014 | MacNeille | G06Q 30/0266 705/14.63 |
| 2016/0253699 A1 | 9/2016 | Liu et al. | |
| 2019/0170529 A1* | 6/2019 | Tseng | G01C 21/3484 |
| 2020/0159251 A1* | 5/2020 | Iwasaki | B60R 16/037 |

OTHER PUBLICATIONS

M.R. Abhari et al., The Effect of Playing Video Advertisement Inside a Car on Driver Visual Distraction, Civil Engineering Journal, vol. 4, No. 8, Aug. 2018.
Z Athul, Ford Patents In-Car Advertising Technology: Reads Roadside Advertisements & Displays It on Infotainment Screen, Four Wheelers, May 18, 2021.

\* cited by examiner

IN-VEHICLE ADVERTISEMENT SYSTEMS AND METHODS

BACKGROUND

Some types of advertisements tend to be very effective in grabbing the attention of a target audience. However, some other types of advertisements fail to do so, particularly in situations where the target audience is a person who is preoccupied with performing a task. It is therefore desirable to address shortcomings in such advertisements.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
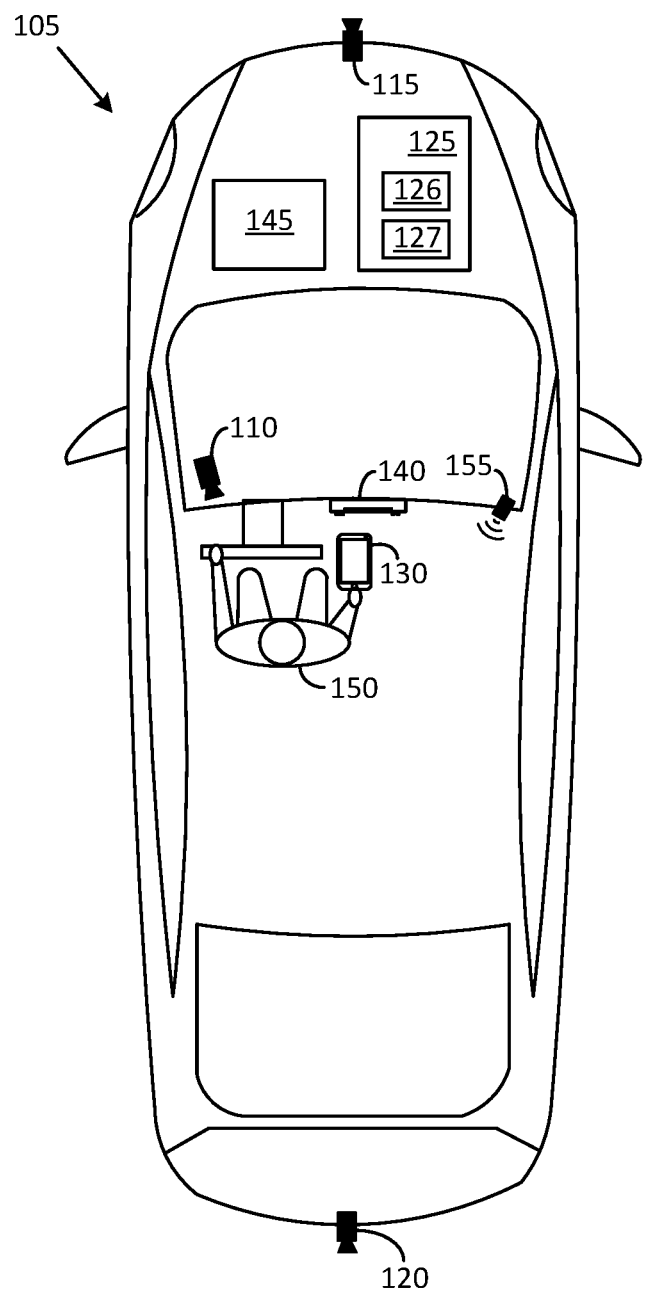
FIG. 1 shows an example vehicle that includes an in-vehicle advertisement system in accordance with an embodiment of the disclosure.

In terms of a general overview, embodiments described in this disclosure are generally directed to in-vehicle advertisement systems and methods. An example method executed by processor of a vehicle may include determining an attention availability index of a driver of a vehicle and determining a first presentation duration of a first advertisement based on the attention availability index. In one scenario, the attention availability index of the driver may be determined by applying an inverse relationship to a concentration index associated with driving the vehicle. The first advertisement is presented over the first presentation duration, via an advertisement presentation device in the vehicle. In another scenario, the attention availability index of the driver may be compared to a threshold value. Based on the comparison, a second presentation duration for a second advertisement may be determined and the second advertisement presented via the advertisement presentation device in the vehicle.

It is noted that the systems and methods disclosed herein should be implemented in situations where such implementation can be done in a safe and reasonable manner. For example, if it is deemed undesirable or not allowed per local jurisdictional rules and regulations, the in-vehicle advertisement systems and methods disclosed herein should be disabled in the vehicle.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, it must be understood that the word "advertisement" as used herein encompasses various forms of presentation including still images, moving images, holographic images, videos, and audio. Thus, in one example scenario, an "advertisement" in accordance with the disclosure can be a video clip displayed on a display screen of a device (such as, for example, an infotainment system in a vehicle, or a smartphone carried by an individual). In another example scenario, an "advertisement" in accordance with the disclosure can be an audio clip reproduced through a speaker of a device (such as, for example, a radio in a vehicle, or a smartphone carried by an individual). The word "vehicle" as used in this disclosure can pertain to any one of various types of vehicles such as cars, vans, sports utility vehicles, trucks, electric vehicles, gasoline vehicles, and hybrid vehicles. It must be understood that words such as "implementation," "application," "scenario," "case," and "situation" as used herein are an abbreviated version of the phrase "In an example ("implementation," "application," "scenario," "case," "approach," and "situation") in accordance with the disclosure." It must also be understood that the word "example" as used herein is intended to be non-exclusionary and non-limiting in nature.

FIG. 1 shows a vehicle 105 that includes an in-vehicle advertisement system 125 in accordance with an embodiment of the disclosure. The in-vehicle advertisement system 125 can include a processor 126 that is configured to execute computer-executable instructions stored in a memory 127 for performing various operations in accordance with the disclosure. Some example operations are described below.

The vehicle 105 may further include components such as, for example, a vehicle computer 145, an infotainment system 140, and various detectors (such as, for example, a camera 110, a camera 115, a camera 120, and an object detector 155). These components may be communicatively coupled to the in-vehicle advertisement system 125 and to the vehicle computer 145. The cameras installed in the vehicle 105 can be any of various types of image capture devices such as, for example, a digital camera that captures a still image or a video camera that captures a video clip and/or real-time video. The object detector 155 can be implemented by use of any one or more devices such as, for example, a radar detector, a sonar detector, a light detection and ranging (LIDAR) detector and/or a motion detector.

The vehicle computer 145 may be operated to execute various operations related to the vehicle 105, such as, for example, controlling engine operations (fuel injection, speed control, emissions control, braking, etc.), managing climate controls (air conditioning, heating etc.), activating airbags, and issuing warnings (check engine light, bulb failure, low tire pressure, etc.). The vehicle computer 145 may also provide various types of information to the in-vehicle advertisement system 125, such as, for example, information pertaining to operations of the vehicle 105 (vehicle speed, engine performance, equipment usage, etc.) and pertaining to actions performed by a driver 150 (accelerating, braking, stopping, etc.).

The infotainment system 140, which is one example of an advertisement presentation device in accordance with the disclosure, may include a combination of various entertainment items (such as a radio, streaming audio solutions, etc., and USB access ports for digital audio devices). The infotainment system 140 may also include other types of items, such as, for example, a navigation system that provides navigation instructions and a guidance system that displays maps upon a display screen of the infotainment system 140. The navigation system can be configured to receive signals from a global positioning system (GPS) satellite.

The infotainment system 140 may also include a clock and/or a chronograph that provides time information to the occupants of the vehicle 105 as well as time information to the in-vehicle advertisement system 125. The in-vehicle advertisement system 125 may use the time information for various purposes such as, for example, to generate and attach timestamps to various events and actions performed by the driver 150 at various times of the day, week, or month. In one implementation, the timestamped information may be stored in a database (not shown) in the form of a historical record of actions performed by the driver 150.

In an example scenario, the driver 150 may carry a mobile device 130. The mobile device 130 can be any of various devices such as, for example, a smartphone, a tablet computer, or a wearable device (smartwatch, for example). The mobile device 130 can provide various functionalities at least some of which can be similar to those provided by the infotainment system 140.

For example, the mobile device 130 can display an advertisement upon a display screen of the mobile device 130 and/or propagate an audio advertisement via a speaker of the mobile device 130 in a manner similar to that performed by the infotainment system 140. It must therefore be understood that the mobile device 130 is another example of an advertisement presentation device in accordance with the disclosure and that the description provided herein with respect to the infotainment system 140 is equally applicable to the mobile device 130.

The object detector 155 may be mounted at any of various locations on the vehicle 105 and is communicatively coupled to the in-vehicle advertisement system 125. In the illustrated example, the object detector 155 is located in a cabin area of the vehicle 105 and is configured to capture images of various objects located inside the vehicle 105. The object detector 155 may be specifically configured to convey a signal to the in-vehicle advertisement system 125 upon detecting a presence of the driver 150 in the vehicle 105. The in-vehicle advertisement system 125 may then communicate with one or more cameras for obtaining images of the driver 150, of one or more passengers, and/or of various objects located inside/outside the vehicle 105 (other vehicles, for example).

The one or more cameras, which may be mounted at any of various locations on the vehicle 105, are communicatively coupled to the in-vehicle advertisement system 125. In the illustrated implementation, the camera 115 and the camera 120 are mounted on an exterior portion of the vehicle 105 and configured to capture images of various objects located outside the vehicle 105. The images may be conveyed to the in-vehicle advertisement system 125, which may evaluate the images to obtain various kinds of information. For example, the in-vehicle advertisement system 125 may evaluate some images to determine a traffic density outside the vehicle 105. In some cases, the in-vehicle advertisement system 125 may evaluate information provided by the navigation system in order to implement an advertisement procedure in accordance with the disclosure.

The camera 110 is mounted in an interior portion of the vehicle 105 such as, for example, on a vehicle member (pillar, frame, etc.) in a cabin area of the vehicle 105. The camera 110 is configured to capture images of various objects located inside the vehicle 105, and may be specifically configured to capture images of the driver 150. The images may be conveyed to the in-vehicle advertisement system 125 in any of various forms such as, for example, in the form of a digital image, a video clip, or a live video feed. The in-vehicle advertisement system 125 may evaluate the images to identify various actions performed by the driver 150. The images may also be evaluated to identify various emotional characteristics and/or physical features of the driver 150 (stress, concentration level, attention level, distraction level, etc.). Information derived from evaluating the driver 150 (and/or from evaluating factors such as a traffic density around the vehicle 105) may be used by the in-vehicle advertisement system 125 to determine an attention availability index associated with the driver 150 (and/or a concentration index associated with the driver 150).

The attention availability index is generally indicative of an amount of attention that the driver 150 may be able to provide to an advertisement displayed on the display screen of the infotainment system 140 and/or an advertisement played through a loudspeaker of the infotainment system 140.

The concentration index may be generally indicative of an amount of attention that the driver 150 has to pay towards driving the vehicle 105 and/or towards other activities related to travel (such as, for example, interacting with a passenger or taking care of a child in the vehicle 105). A higher concentration index generally indicates that the driver 150 has to pay more attention to driving the vehicle 105 (high traffic density, for example) and/or to attending to other matters (taking care of a child in the vehicle 105, for example), consequently resulting in a reduction of the attention availability index.

In an example implementation, the in-vehicle advertisement system 125 determines the concentration index based on a first set of factors (vehicle-related factors) and/or on a second set of factors (driver-related factors). In other implementations, the in-vehicle advertisement system 125 may determine the concentration index based on a single factor, multiple factors, one set of factors, or three or more sets of factors.

The concentration index may be quantified and applied in various ways in accordance with the disclosure. In a first example implementation, the concentration index is quantified by use of a scale that is defined on the basis of percentage values (ranging from 0% to 100%). Thus, in one scenario, the in-vehicle advertisement system 125 may assign a 100% rating upon the concentration index when the driver 150 has to pay complete attention to the road due to heavy, fast-moving traffic. In another scenario, the in-vehicle advertisement system 125 may assign a 50% rating upon the concentration index when the driver 150 can take his/her eyes off the road occasionally (such as, for example, when traveling on a road having light traffic). In yet another scenario, the in-vehicle advertisement system 125 may assign a 1% rating upon the concentration index when the driver 150 can take his/her eyes off the road for an extended period of time (such as, for example, when the vehicle 105 is in a parked condition).

In the first example implementation described above, the attention availability index may have an inverse relationship to the concentration index, and can be quantified by use of the same percentage scale. Thus, when the concentration index is rated at 100% the attention availability index may be inversely proportional and set equal to zero, when the concentration index is rated at 51% the attention availability index may be inversely proportional and set equal to 49%, and when the concentration index is rated at 1% the attention availability index may be inversely proportional and set equal to 99%.

In a second example implementation, the concentration index is quantified by use of a scale having a numerical range, such as, for example, a numerical range extending from 1 to 10. In this case, the in-vehicle advertisement system 125 may, for example, assign a 10 rating upon the concentration index when the driver 150 has to pay complete attention to the road due to heavy, fast-moving traffic. The in-vehicle advertisement system 125 may assign a 5 rating upon the concentration index when the driver 150 can take his/her eyes off the road occasionally (such as, for example, when traveling on a road having light traffic). The in-vehicle advertisement system 125 may assign a 1 rating upon the concentration index when the driver 150 can take his/her eyes off the road for an extended period of time (such as, for example, when the vehicle 105 is in a parked condition).

In this second example implementation, the attention availability index may again have an inverse relationship to the concentration index, and quantified by use of the numerical range. Thus, the attention availability index may be nearly zero when the concentration index is rated at 10, may be 5 when the concentration index is rated at 5, and may be 9 when the concentration index is rated at 1.

The in-vehicle advertisement system 125 can use the concentration index and/or the attention availability index described above to determine a duration of an advertisement that can be presented via the infotainment system 140. In a first example implementation, a duration of an advertisement has an inverse relationship to the attention availability index. Thus, for example, the duration of an advertisement may last a longer period of time when the attention availability index is high (for example, when the driver 150 can take his/her eyes off the road) and last a comparatively shorter period of time when the attention availability index is low (when the driver 150 is concentrating on driving). Setting the duration of the advertisement to a longer period of time may allow at least a portion of the advertisement to have an impact upon the driver 150. For example, the driver 150 may hear a portion of an advertisement in a subconscious manner while paying undivided attention to the road.

In a second example implementation, a duration of an advertisement may be set to have a direct relationship to the concentration index (converse to the inverse relationship with the attention availability index). Thus, for example, the duration of an advertisement may correspond to a longer period of time when the concentration index is low (for example, when the driver 150 can take his/her eyes off the road) and a comparatively shorter period of time when the concentration index is high (when the driver 150 is concentrating on driving).

Figure 2:
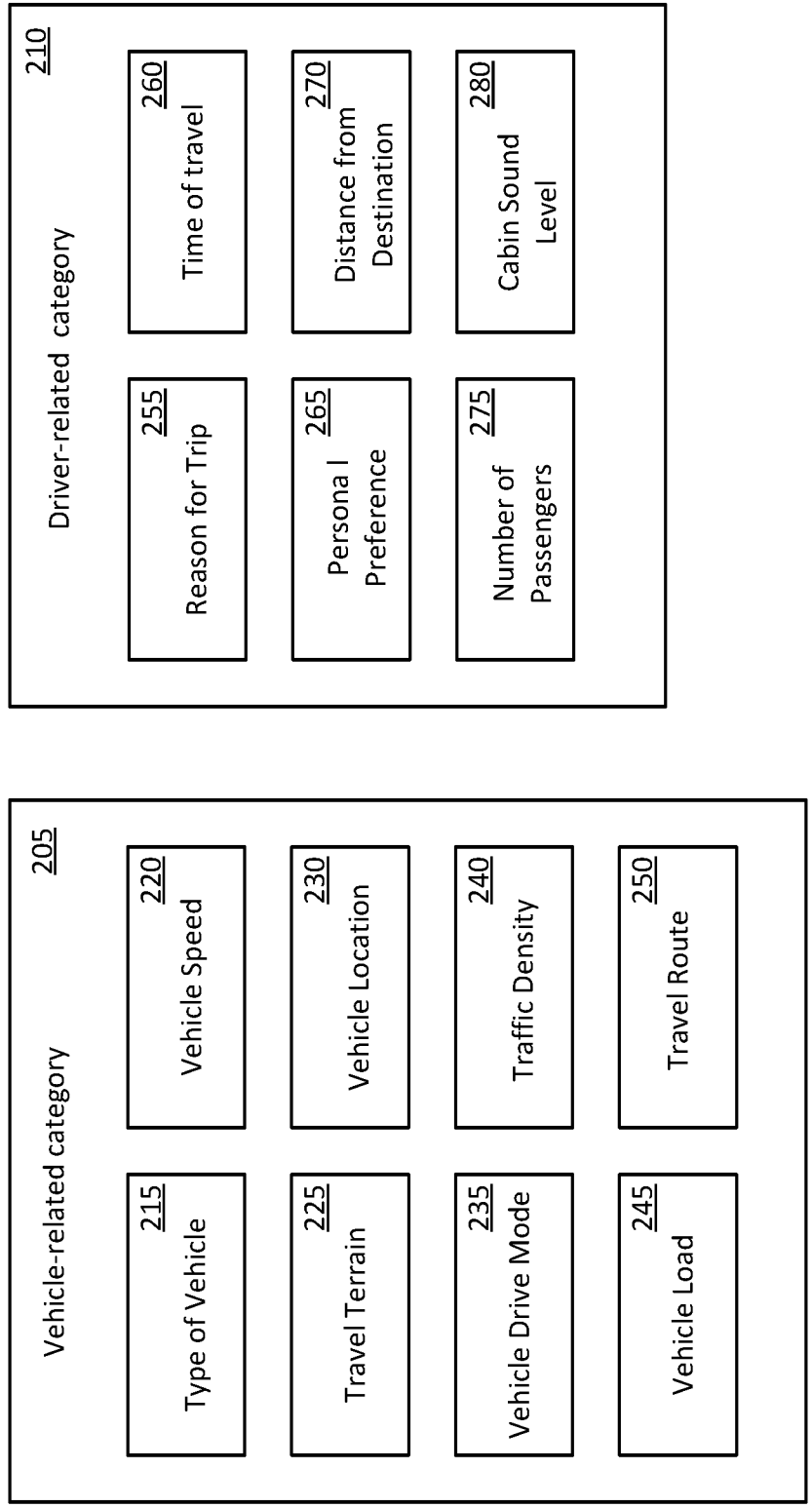
FIG. 2 shows example contributory factors that may be used to determine an attention availability index of a driver of a vehicle in accordance with an embodiment of the disclosure.

FIG. 2 shows example contributory factors that may be used to determine an attention availability index of the driver 150 of the vehicle 105 in accordance with an embodiment of the disclosure. The description provided below with respect to the attention availability index is applicable to the concentration index as well, and must be understood in the context of the inverse relationship between the concentration index and the attention availability index described above.

The example contributory factors may be broadly classified into two categories. A first category may be referred to as a vehicle-related category 205 and a second category may be referred to as a driver-related category 210. The vehicle-related category 205 generally includes various factors associated with operations of the vehicle 105 that may affect an attention availability index of the driver 150. The driver-related category 210 generally includes various factors associated with the driver 150 that may affect an attention availability index of the driver 150.

A non-exhaustive list of example factors that may be included in the vehicle-related category 205 is shown in FIG. 2. A first example factor is a type of vehicle 215 such as, for example, a stick-shift vehicle, an automatic drive vehicle, an autonomous vehicle, a van, a truck, a bus etc. In an example scenario, the in-vehicle advertisement system 125 may assign a higher value to the attention availability index when the vehicle 105 is a stick-shift vehicle and a lower value when the vehicle 105 is an autonomous (or semi-autonomous) vehicle. Operating a stick-shift vehicle requires a higher level of attention to driving in comparison to operating an autonomous (or semi-autonomous) vehicle.

A second example factor that is included in the vehicle-related category 205 is a vehicle speed 220. In an example scenario, the driver 150 has to pay more attention to driving when the speed of the vehicle 105 is high in comparison to driving when the speed of the vehicle 105 is relatively lower. In this example scenario, the in-vehicle advertisement system 125 may assign a higher value to the attention availability index when the vehicle 105 is traveling at a high speed and a relatively lower value when the vehicle 105 is traveling at a lower speed.

A third example factor that is included in the vehicle-related category 205 is a travel terrain 225. In an example scenario, the driver 150 has to pay more attention to driving the vehicle 105 when the terrain over which the vehicle 105 is moving is unpaved (off-road, dirt track, gravel surface, sand surface, etc.) than when the vehicle 105 is moving on a paved surface (state highway, interstate, etc.). In this example scenario, the in-vehicle advertisement system 125 may assign a higher value to the attention availability index when the vehicle 105 is traveling on the unpaved surface and a relatively lower value when the vehicle 105 is traveling on the paved surface.

A fourth example factor that is included in the vehicle-related category 205 is a vehicle location 230. In an example scenario, the driver 150 has to pay more attention to driving the vehicle 105 when the vehicle 105 is located in an area having poor driving conditions (snow, rain, cold, etc.) than when the vehicle 105 is located in an area having good driving conditions (sunshine, clear view, etc.). In this example scenario, the in-vehicle advertisement system 125 may assign a higher value to the attention availability index when the vehicle 105 is traveling in the area having poor driving conditions and a relatively lower value when the vehicle 105 is traveling in the area having good driving conditions.

A fifth example factor that is included in the vehicle-related category 205 is a vehicle drive mode 235. In an example scenario, the driver 150 has to pay more attention to driving the vehicle 105 (a stick-shift vehicle, for example) when the vehicle 105 is moving slowly in low gear (second gear, for example) than when the vehicle 105 is moving faster in high gear (top gear, for example). In this example scenario, the in-vehicle advertisement system 125 may assign a higher value to the attention availability index when the vehicle 105 is moving slowly in low gear and a relatively lower value when the vehicle 105 is moving faster in high gear.

A sixth example factor that is included in the vehicle-related category 205 is traffic density 240. In an example scenario, the driver 150 has to pay more attention to driving the vehicle 105 when the traffic density is high and the vehicle 105 is moving among several other vehicles than when the traffic density is low and a fewer number of vehicles (or no vehicles) are present around the vehicle 105. In this example scenario, the in-vehicle advertisement system 125 may assign a higher value to the attention availability index when the traffic density is high and a relatively lower value when the traffic density is low.

A seventh example factor that is included in the vehicle-related category 205 is vehicle load 245. In an example scenario, the driver 150 has to pay more attention to driving the vehicle 105 when the vehicle load 205 is high (such as, for example, a heavy cargo and/or a trailer attachment) than when the vehicle load 205 is low (empty trunk, empty cargo bed, etc.). In this example scenario, the in-vehicle advertisement system 125 may assign a higher value to the attention availability index when the vehicle load is high and a relatively lower value when the vehicle load is low.

An eighth example factor that is included in the vehicle-related category 205 is a travel route 250. In an example scenario, the driver 150 has to pay more attention to driving the vehicle 105 when the travel route is arduous (long distance, windy, steep, etc.) than when the travel route is easy (short distance, flat terrain, etc.). In this example scenario, the in-vehicle advertisement system 125 may assign a higher value to the attention availability index when the travel route is arduous and a relatively lower value when the travel route is easy.

The driver-related category 210 generally includes various factors associated with the driver 150 of the vehicle 105 that may affect an attention availability index of the driver 150. A non-exhaustive list of example factors that may be included in the driver-related category 210 is shown in FIG. 2. A first example factor is a reason for a trip 255. The in-vehicle advertisement system 125 may assign a higher value to the attention availability index when, for example, the reason for a trip pertains to work (commuting to work, for example) and a lower value when, for example, the reason for a trip pertains to pleasure (a weekend drive to a getaway spot, for example).

A second example factor is a time of travel 260. The in-vehicle advertisement system 125 may assign a higher value to the attention availability index when, for example, the time of travel 260 is during a work day (or during peak commute times) and a lower value when, for example, the time of travel 260 is during a weekend.

A third example factor is personal preference 265. The in-vehicle advertisement system 125 may assign a higher value to the attention availability index when, for example, the driver 150 has a higher preference for a certain type of advertisement (and/or responds favorably to a certain type of advertisement) and a lower value when, for example, the driver 150 does not prefer a certain type of advertisement. Information pertaining to personal preference 265 may be obtained in various ways. In a first example scenario, the in-vehicle advertisement system 125 may obtain such information from a database of the in-vehicle advertisement system 125 (and/or from a cloud computer or a cloud storage device).

In one implementation, the information stored in the database can be historical information obtained by execution of a learning procedure upon the driver 150. The learning procedure may be executed by the in-vehicle advertisement system 125 or by another system configured to execute the learning procedure. In another implementation, personal preference information of the driver 150 may be unavailable. In this case, the in-vehicle advertisement system 125 may utilize information obtained from other sources (via polling procedures, monitoring procedures, statistical information, etc.).

The learning procedure for obtaining information about the preferences of the driver 150 may be based on contextual combinations, where mean and standard deviation measurements of time may be determined after the driver 150 activates a skip button on the infotainment system 140 to skip an advertisement. Some example equations that may be applicable to an example learning procedure are as follows:

$$\mu delta\_skip, i,j,k(t+1) = \alpha * \mu delta\_skip, i,j,k(t) + (1-\alpha) * Tdelta\_skip; \leftarrow \text{mean update}$$

$$\sigma 2delta\_skip, i,j,k(t+1) = \alpha * (\sigma 2delta\_skip, i,j,k(t)) + (1-\alpha) * (Tdelta\_skip - \mu delta\_skip, i,j,k(t))2; \leftarrow \text{variance update}$$

where i, j & k are the (encoding) indices of major impact factors such as: vehicle speed range, presence of passenger, day/time, frequent routes . . . etc.

Pessimistic estimate of ads time playing time:

μ−z*σ→based on our usage to push for longer ads viewing time, clip this with min of zero.

Optimistic estimate of ads time playing time:

μ+z*σ→consider clip this with max of a large number so user won't be forced to see full ads every single time.

A third example factor is a distance to destination 270. The in-vehicle advertisement system 125 may assign a higher value to the attention availability index when, for example, the driver 150 is more amenable to paying attention to an advertisement because the vehicle 105 is at a relatively short distance from a trip destination, and a lower value when the vehicle 105 is far from the trip destination and the driver 150 is anxious to reach the destination.

A fourth example factor is a number of passengers 275 present in the vehicle 105. The in-vehicle advertisement system 125 may assign a higher value to the attention availability index when, for example, no passengers are present in the vehicle 105 (the driver 150 is more amenable to paying attention to an advertisement) and a lower value when one or more passengers are present in the vehicle 105 (the driver 150 may be more interested in interacting with the passenger(s) than paying attention to an advertisement).

A fifth example factor is a cabin sound level 280 in the vehicle 105. The in-vehicle advertisement system 125 may assign a higher value to the attention availability index when, for example, the cabin sound level 280 is low (for example, because no passengers are present in the vehicle 105) and a lower value when the cabin sound level 280 is high (for example, because one or more passengers are talking loudly with each other).

Figure 3:
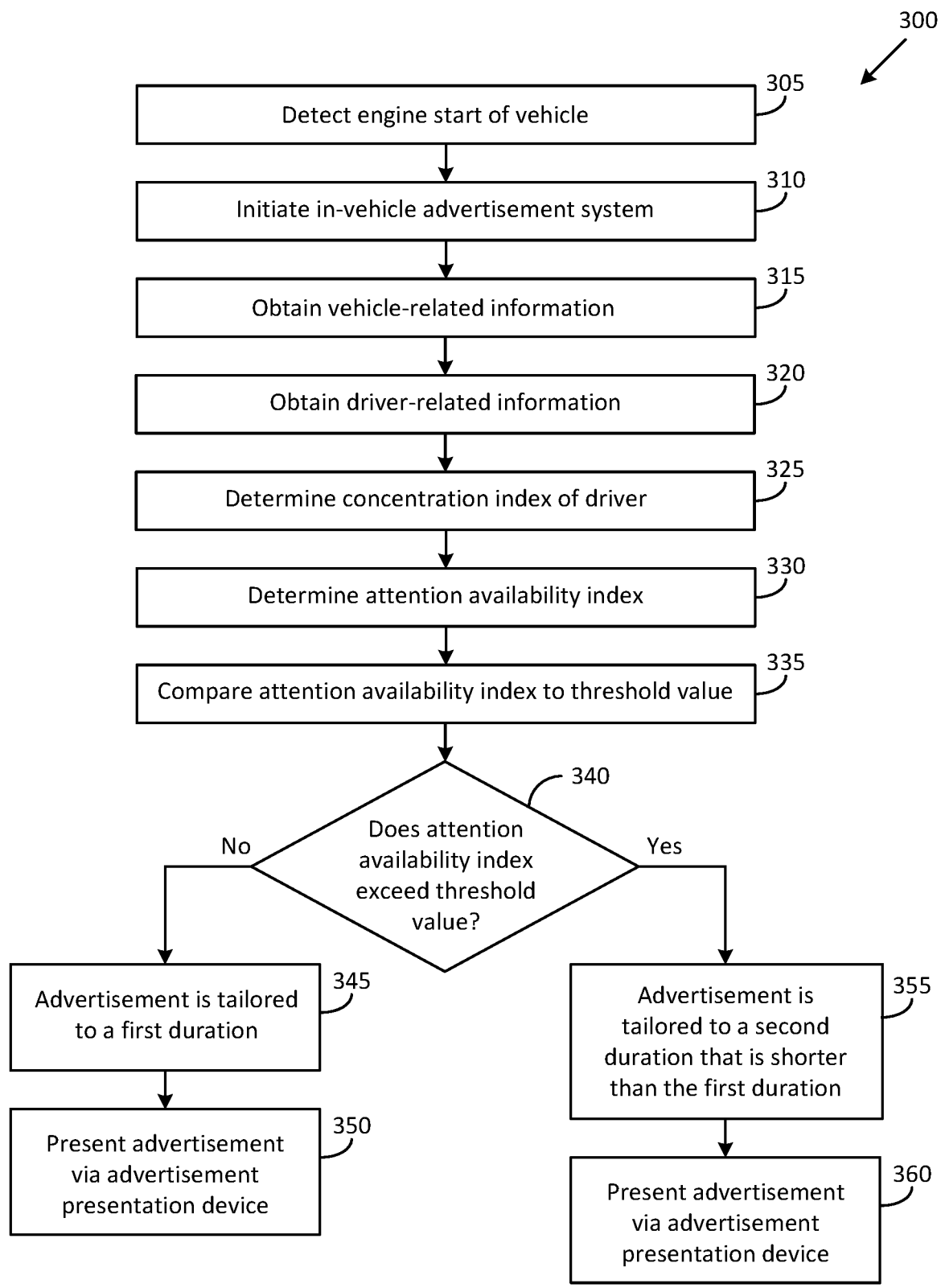
FIG. 3 shows a flowchart of a method to present in-vehicle advertisements in accordance with an embodiment of the disclosure.

FIG. 3 shows a flowchart 300 of a method to present in-vehicle advertisements in accordance with an embodiment of the disclosure. The flowchart 300 illustrates a sequence of operations that can be implemented in hardware, software, or a combination thereof. In the context of software, the operations represent computer-executable instructions stored on one or more non-transitory computer-readable media such as the memory 127 of the in-vehicle advertisement system 125, that, when executed by one or more processors such as the processor 126, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. The vehicle 105 and the various contributory factors shown in FIG. 2 are referred to below in the form of examples and it must be understood that the description of the flowchart 300 is equally applicable to various other vehicles and various other contributory factors.

At block 305, the processor 126 detects an engine of the vehicle 105 being started. In an example scenario, the detection may be based on the in-vehicle advertisement system 125 receiving information from the vehicle computer 145.

At block 310, the processor 126 initiates the in-vehicle advertisement system 125. Initiating the in-vehicle advertisement system 125 can include actions such as, for example, launching a software application in the infotainment system 140 and/or in the mobile device 130.

At block 315, the processor may obtain vehicle-related information. In an example implementation, information related to some or all of the factors illustrated in the vehicle-related category 205 (FIG. 2) may be obtained. The information can be obtained from various sources. For example, information pertaining to the type of vehicle 215 may be obtained from the vehicle computer 145 and/or from database of a computer such as one hosted by a manufacturer of the vehicle 105. The vehicle speed 220 may be obtained from the vehicle computer 145. Information pertaining to the travel terrain 225 may be obtained by evaluating images provided by one or more cameras mounted on the vehicle 105, such as, for example, the camera 115. Information pertaining to the travel terrain 225 can also be obtained from sources such as, for example, from public records and navigation systems such as Google® maps. Information pertaining to the vehicle location 230 may be obtained from a GPS navigation system that can be a part of the infotainment system 140. Information pertaining to the vehicle drive mode 235 may be obtained from the vehicle computer 145. Information pertaining to the traffic density 240 may be obtained by evaluating images provided by one or more cameras mounted on the vehicle 105. Information pertaining to the vehicle load 245 may be obtained from a weight sensor provided in the vehicle 105. Information pertaining to the travel route 250 may be obtained from sources such as, for example, a navigation system that can be a part of the infotainment system 140.

At block 320, the processor may obtain driver-related information. In an example implementation, information related to some or all of the factors illustrated in the driver-related category 210 (FIG. 2) may be obtained. The information can be obtained from various sources. For example, information pertaining to the reason for the trip 255, such as for a recreational purpose or a non-recreational purpose, may be based on information provided by the driver 150, historical information pertaining to actions performed by the driver 150 at various times, location information (residence, office, workplace, store, recreational facility, park, etc.). Information pertaining to time of travel 260 may be obtained from the clock or chronograph that can be a part of the infotainment system 140. Information pertaining to personal preference 265 can be obtained via input provided by the driver 150 and/or monitoring actions performed by the driver 150. In one implementation, monitoring of actions performed by the driver 150 may be carried out by the in-vehicle advertisement system 125 based on evaluating images provided to the in-vehicle advertisement system 125 by the camera 110, for example. Information pertaining to the distance to destination 270 may be obtained from any of various sources such as, for example, from a GPS navigation system that can be a part of the infotainment system 140 In some cases, a predicted distance value may be used. Information pertaining to the number of passengers 275 in the vehicle 105 may be identified by evaluating images provided to the in-vehicle advertisement system 125 by the camera 110. Information pertaining to the cabin sound level 280 may be obtained via a microphone that can be a part of the infotainment system 140.

At block 325, a concentration index associated with the driver 150 may be determined. In an example implementation, the in-vehicle advertisement system 125 determines the concentration index based on a first set of factors such as, for example, vehicle-related factors, and/or on a second set of factors such as, for example, driver-related factors. Some details pertaining to the determination procedure are described above.

At block 330, an attention availability index associated with the driver 150 may be determined. In an example implementation, the in-vehicle advertisement system 125 determines the attention availability index by using an inverse relationship to the concentration index. Thus, for example, in one scenario, the in-vehicle advertisement system 125 may assign a 40% rating to the attention availability index based on a concentration index rating of 60%. In another example scenario, the in-vehicle advertisement system 125 may assign a 6 rating to the attention availability index based on a rating of 4 to the concentration index (1-10 range).

At block 335, the attention availability index is compared to a threshold value. For example, the attention availability index having the 40% rating may be compared against a threshold value of 50%, or the attention availability index having the 6 rating may be compared against a threshold value of 5. The threshold value may be set by various entities, such as, for example, an executive of an advertisement agency.

At block 340, a determination is made whether the attention availability index exceeds the threshold value.

In one scenario, the attention availability index fails to exceeds the threshold value. The failure may be caused by the driver 150 having to pay attention to his/her driving as a result of high traffic density around the vehicle 105. In this scenario, at block 345, an advertisement is tailored to be presented over a first duration of time. For example, an advertisement of a product may be tailored to last a 15-second duration.

At block 350, the first advertisement is displayed and/or heard for a 15-second duration via an advertisement presentation device (such as, for example, the infotainment system 140 or the mobile device 130).

In another scenario, the attention availability index exceeds the threshold value because, for example, the driver 150 may be in a position to take his/her eyes off the road momentarily in order to observe an advertisement being displayed on the infotainment system 140. In this scenario, at block 355, an advertisement is tailored to have a second duration that is shorter than the first duration. The advertisement can be a shorter version of the 15-second advertisement or a different advertisement. For example, an advertisement of the same product (or a different product) may be tailored to last a 5-second duration.

At block 360, the 5-second duration advertisement is displayed and/or heard via the advertisement presentation device (such as, for example, the infotainment system 140 or the mobile device 130).

Figure 4:
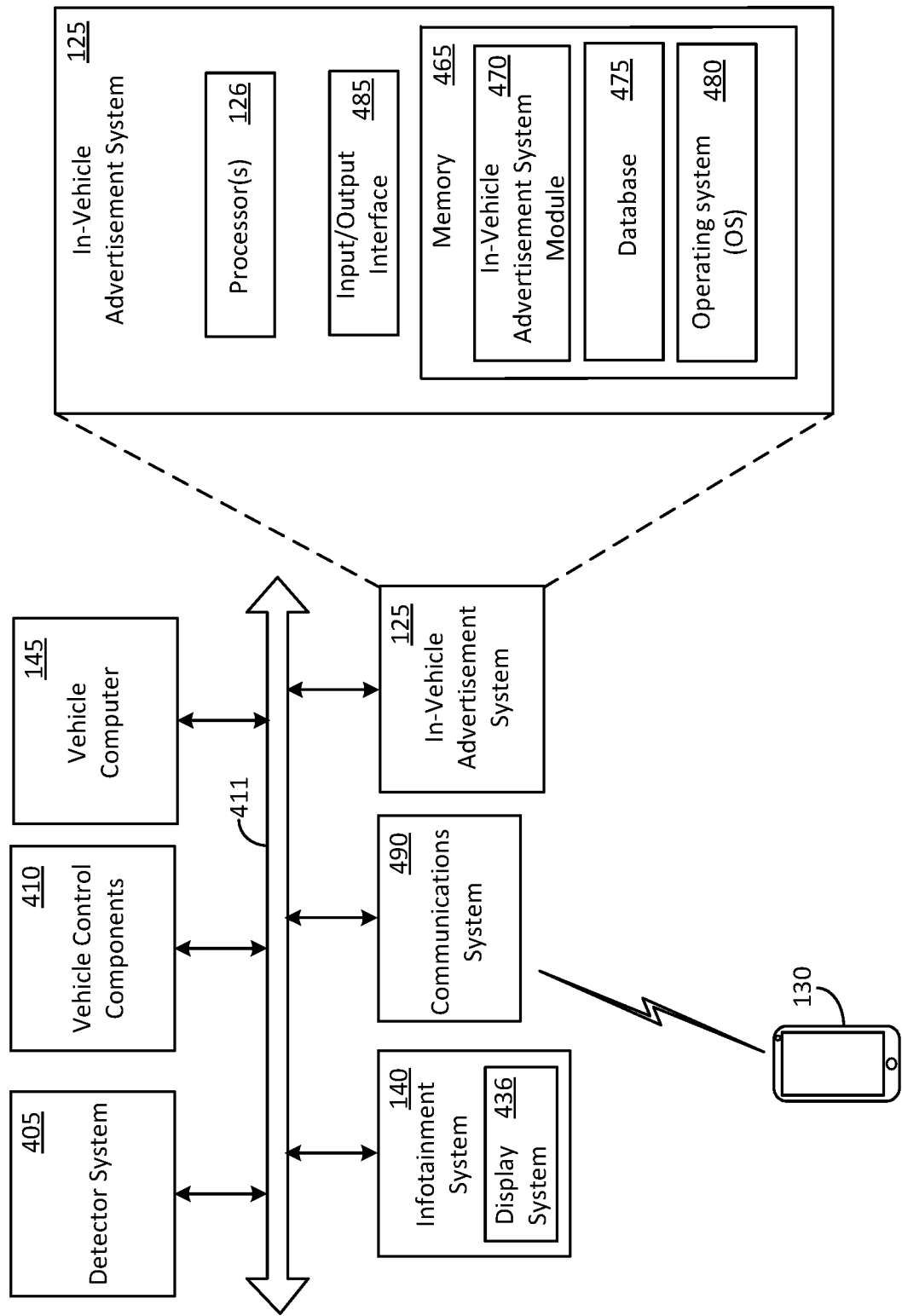
FIG. 4 shows some example components that can be included in a vehicle in accordance with an embodiment of the disclosure.

FIG. 4 shows some example components that can be included in the vehicle 105 in accordance with an embodiment of the disclosure. The example components can include a detector system 405, vehicle control components 410, the vehicle computer 145, the infotainment system 140, a communications system 490, and the in-vehicle advertisement system 125. The various components are communicatively coupled to each other via one or more buses such as an example bus 411. The bus 411 may be implemented using various wired and/or wireless technologies. For example, the bus 411 can be a vehicle bus that uses a controller area network (CAN) bus protocol, a Media Oriented Systems Transport (MOST) bus protocol, and/or a CAN flexible data (CAN-FD) bus protocol. Some or all portions of the bus 411 may also be implemented using wireless technologies such as Bluetooth®, Ultra-Wideband, Wi-Fi, Zigbee®, or near-field-communications (NFC).

The infotainment system 140 can include a display system 436 having a GUI for carrying out various operations. The GUI may be used, for example, by the driver 150 to provide information that may be pertinent to the in-vehicle advertisement system 125, such as, for example, personal preferences of the driver 150 with respect to advertisements. The information may be stored in a database 475 of the in-vehicle advertisement system 125. The in-vehicle advertisement system 125 may communicate with the infotainment system 140 for displaying advertisements of varying durations in accordance with the disclosure.

The detector system 405 can include various types of detectors such as, for example, the camera 115, the camera 120, and the object detector 155 that are shown in FIG. 1.

The vehicle control components 410 can include various components and systems associated with driving functions of the vehicle 105 (such as, for example, the engine, brakes, accelerator, and fuel injection) and various other functions of the vehicle 105 (such as, for example, stocks and struts whose characteristics can be controlled for varying a performance of the vehicle 105). The various components may be controlled, activated, and/or operated by the vehicle computer 145.

The communications system 490 an include various components such as, for example, a wireless transmitter, a wireless receiver, and/or a wireless transceiver, that are configured to allow the in-vehicle advertisement system 125 to communicate with devices such as, for example, the mobile device 130. The communications may be carried out via wireless signals having various communication formats such as, for example, Bluetooth®, Ultra-Wideband, Wi-Fi, Zigbee®, or near-field-communications (NFC).

In one implementation, the in-vehicle advertisement system 125 can be an independent device (enclosed in an enclosure, for example). In another implementation, some or all components of the in-vehicle advertisement system 125 can be housed, merged, or can share functionality, with the vehicle computer 145. For example, an integrated unit that combines the functionality of the in-vehicle advertisement system 125 with that of the vehicle computer 145 can be operated by a single processor and a single memory device. In the illustrated example configuration, the in-vehicle advertisement system 125 includes the processor 126, an input/output interface 485, and a memory 465.

The input/output interface 485 is configured to provide communications between the in-vehicle advertisement system 125 and other components such as the detector system 405 (for receiving images from the cameras, for example).

The memory 465, which is one example of a non-transitory computer-readable medium, may be used to store an operating system (OS) 480, a database 475, and various code modules such as a vehicle payload assistance system module 470. The code modules are provided in the form of computer-executable instructions that can be executed by the processor 126 for performing various operations in accordance with the disclosure.

The database 475 may be used to store information such as, for example, information associated with the various factors included in the vehicle-related category 205 and the driver-related category 210.

The vehicle payload assistance system module 470 may be executed by the processor 126 for performing various operations in accordance with the disclosure including, for example, the various operations disclosed in the flowchart 300 described above.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 465, can include any one memory element or a combination of volatile memory elements (e.g., random access memory (RAM, such as DRAM, SRAM, SDRAM, etc.)) and non-volatile memory elements (e.g., ROM, hard drive, tape, CD ROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such condi- That which is claimed is:

1. A method comprising:
capture, by a first camera mounted on an exterior portion of a vehicle, images of objects;
determine, by a processor, a traffic density outside of the vehicle based on the images of objects captured by the first camera;
capture, by a second camera mounted in an interior of the a-vehicle, an image of a driver of the vehicle;
determine, by the processor, characteristics or features of the driver based at least on the image of the driver;
determine, by a weight sensor in the vehicle, information pertaining to a vehicle load;
determine, by an infotainment system of the vehicle, a cabin sound level, the infotainment system being communicatively coupled to the first and second cameras;
determining, by the processor, an attention availability index of the driver based on each of the characteristics or features of the driver, the traffic density, the vehicle load, and the cabin sound level;
determining, by the processor, based on the attention availability index, a first presentation duration of a first advertisement; and
presenting, by the processor, the first advertisement via the infotainment system.

2. The method of claim 1, wherein determining the attention availability index of the driver comprises:
determining, by the processor, a concentration index associated with driving the vehicle; and
determining, by the processor, the attention availability index based on an inverse relationship to the concentration index,
wherein the concentration index and the attention availability index are quantified using a numerical range or percentage values.

3. The method of claim 2, wherein the first presentation duration of the first advertisement is selected to be inversely proportional to the attention availability index of the driver.

4. The method of claim 2, further comprising:
comparing, by the processor, the attention availability index to a preset threshold value;
determining that the attention availability index exceeds the preset threshold value because the driver is in a position to take his/her eye off the road;
selecting, by the processor, a second presentation duration for a second advertisement presentation, the second presentation duration being shorter than the first presentation duration; and
presenting, by the processor, the second advertisement presentation via the advertisement presentation device in the vehicle.

5. The method of claim 1, wherein determining the attention availability index of the driver comprises:
identifying, by the processor, a speed of movement of the vehicle, a first characteristic associated with a travel route, a second characteristic associated with a reason for a trip in the vehicle, and/or a personal preference of the driver; and
determining, by the processor, the attention availability index, based on each of the speed of movement of the vehicle, the first characteristic, the second characteristic, and the personal preference of the driver, in addition to the characteristics or features of the driver, the traffic density, the vehicle load, and the cabin sound level.

6. The method of claim 5, wherein the first characteristic associated with the travel route is based on one of a location of the vehicle along the travel route, and/or a distance of the vehicle from a destination.

7. The method of claim 5, wherein determining the attention availability index based on the speed of movement of the vehicle comprises assigning a first attention availability index when the vehicle is moving at a first speed and a second attention availability index when the vehicle is moving at a second speed, wherein the second speed is slower than the first speed and wherein the second attention availability index is higher than the first attention availability index.

8. The method of claim 5, wherein determining the attention availability index based on the second characteristic associated with the reason for the trip in the vehicle comprises assigning a first attention availability index when the reason is associated with a recreational purpose and a second attention availability index when the reason is associated with a non-recreational purpose, wherein the recreational purpose and the non-recreational purpose is determined based on information provided by the driver and historical information of actions performed by the driver, and wherein the first attention availability index is higher than the second attention availability index.

9. A method comprising:
capture, by a first camera mounted on an exterior portion of a vehicle, images of objects;
determine, by a processor, a traffic density outside of the vehicle based on the images of objects captured by the first camera;
capturing, by a second camera mounted in an interior of a vehicle, an image of a driver of the vehicle;
determine, by the processor, characteristics or features of the driver based at least on the image of the driver;
determine, by a weight sensor in the vehicle, information pertaining to a vehicle load;
determine, by an infotainment system of the vehicle, a cabin sound level, the infotainment system being communicatively coupled to the first and second cameras;
determining, by the processor, a concentration index associated with the driver based on each of the characteristics or features of the driver, the traffic density, the vehicle load, and the cabin sound level;
determining, by the processor, an attention availability index of the driver based on an inverse relationship to the concentration index;
determining, by the processor, based on the attention availability index, a first presentation duration of a first advertisement; and
presenting, by the processor, the first advertisement such that the first advertisement is displayed on a mobile device of the driver.

10. The method of claim 9, further comprising:
identifying, by the processor, a speed of movement of the vehicle, a first characteristic associated with a travel route, a second characteristic associated with a reason for a trip in the vehicle, and/or a personal preference of the driver; and
determining, by the processor, the attention availability index, based on each of the speed of movement of the vehicle, the first characteristic, the second characteristic, and/or the personal preference of the driver, in addition to the characteristics or features of the driver, the traffic density, the vehicle load, and the cabin sound level.

11. The method of claim 10, wherein the first characteristic associated with the travel route is based on one of a location of the vehicle along the travel route, and/or a distance of the vehicle from a destination.

12. The method of claim 10, wherein determining the attention availability index based on the speed of movement of the vehicle comprises assigning a first attention availability index when the vehicle is moving at a first speed and a second attention availability index when the vehicle is moving at a second speed, wherein the second speed is slower than the first speed and wherein the second attention availability index is higher than the first attention availability index.

13. The method of claim 12, wherein the first presentation duration of the first advertisement is based on the first attention availability index, and wherein the method further comprises:
    determining, by the processor, based on the second attention availability index, a second presentation duration of a second advertisement; and
    presenting, by the processor, one of the first advertisement or the second advertisement based on a respective one of the first attention availability index or the second attention availability index.

14. The method of claim 10, wherein determining the attention availability index based on the second characteristic associated with the reason for the trip in the vehicle comprises assigning a first attention availability index when the reason is associated with a recreational purpose and a second attention availability index when the reason is associated with a non-recreational purpose, wherein the recreational purpose and the non-recreational purpose is determined based on information provided by the driver and historical information of actions performed by the driver, and wherein the first attention availability index is higher than the second attention availability index.

15. A vehicle comprising:
    a first camera mounted on an exterior portion of the vehicle;
    a second camera mounted in an interior of the vehicle;
    a weight sensor;
    an infotainment system communicatively coupled to the first and second cameras; and
    an in-vehicle advertisement system comprising:
        a memory containing computer-executable instructions; and
        a processor configured to access the memory and execute the computer-executable instructions to perform operations comprising:
            capturing, by the first camera, images of objects;
            determining a traffic density outside the vehicle based on the images of objects captured by the first camera;
            capturing, by the second camera, an image of a driver of the vehicle;
            determining characteristics or features of the driver based at least on the image of the driver;
            determining, by the weight sensor, information pertaining to a vehicle load;
            determining, by the infotainment system, a cabin sound level;
            determining an attention availability index of a driver of the vehicle based on each of the characteristics or features of the driver, the traffic density, the vehicle load, and the cabin sound level;
            determining, based on the attention availability index, a presentation duration of an advertisement; and
            presenting the advertisement via the the infotainment system.

16. The vehicle of claim 15, wherein determining the attention availability index of the driver comprises:
    determining a concentration index associated with driving the vehicle; and
    determining the attention availability index based on an inverse relationship to the concentration index,
    wherein the concentration index and the attention availability index are quantified using a numerical range or percentage values.

17. The vehicle of claim 16, wherein the presentation duration of the advertisement is selected to be inversely proportional to the attention availability index of the driver.

18. The vehicle of claim 15, wherein determining the attention availability index of the driver comprises:
    identifying a speed of movement of the vehicle, a first characteristic associated with a travel route, a second characteristic associated with a reason for a trip in the vehicle, and/or a personal preference of the driver; and
    determining the attention availability index, based on each of the speed of movement of the vehicle, the first characteristic, the second characteristic, and/or the personal preference of the driver, in addition to the characteristics or features of the driver, the traffic density, the vehicle load, and the cabin sound level.

19. The vehicle of claim 18, wherein the first characteristic associated with the travel route is based on one of a location of the vehicle along the travel route, and/or a distance of the vehicle from a destination.

20. The vehicle of claim 18, wherein determining the attention availability index based on the speed of movement of the vehicle comprises assigning a first attention availability index when the vehicle is moving at a first speed and a second attention availability index when the vehicle is moving at a second speed, wherein the second speed is slower than the first speed and wherein the second attention availability index is higher than the first attention availability index.

* * * * *